United States Patent [19]

Braun et al.

[11] Patent Number: 5,331,077
[45] Date of Patent: Jul. 19, 1994

[54] ALKENYL GROUP-CONTAINING ORGANO(POLY)SILOXANES

[75] Inventors: Rudolf Braun, Kastl; Karl Braunsperger, Burghausen, both of Fed. Rep. of Germany

[73] Assignee: Wacker-Chemie GmbH, Munich

[21] Appl. No.: 996,438

[22] Filed: Dec. 24, 1992

[30] Foreign Application Priority Data

Dec. 30, 1991 [DE] Fed. Rep. of Germany ....... 4143203

[51] Int. Cl.$^5$ .............................................. C08G 77/12
[52] U.S. Cl. ......................................... 528/31; 528/15; 528/32; 556/450; 556/455; 556/456
[58] Field of Search .............................. 528/15, 32, 31; 556/450, 455, 456

[56] References Cited

U.S. PATENT DOCUMENTS

| | | |
|---|---|---|
| 3,498,945 | 3/1970 | Lefort. |
| 3,719,630 | 3/1973 | Antonen. |
| 3,772,247 | 11/1973 | Flannigan. |
| 3,846,464 | 11/1974 | Razzano. |
| 4,242,486 | 12/1980 | August et al. ........................ 528/15 |
| 4,303,572 | 12/1981 | Hatanaka et al. ..................... 528/15 |

FOREIGN PATENT DOCUMENTS

| | | |
|---|---|---|
| 0400614 | 12/1990 | European Pat. Off. . |
| 1011147 | 6/1957 | Fed. Rep. of Germany . |
| 1023463 | 1/1958 | Fed. Rep. of Germany . |
| 1745342 | 11/1971 | Fed. Rep. of Germany . |
| 2455502 | 7/1975 | Fed. Rep. of Germany . |
| 752371 | 7/1956 | United Kingdom . |

OTHER PUBLICATIONS

Database WPIL, Derwent Publications Ltd., London GB; AN 92–068367 & JP–A–4011634 (Toray Dow Corning) Jan. 16, 1992 (Abstract).

*Primary Examiner*—Melvyn L. Marquis

[57] ABSTRACT

Organo(poly)siloxanes composed of units of the formula $[R_aR^1_{3-a}SiO_{1/2}]$, $[R_bR^1_{2-b}SiO_{2/2}]$ and $[R^1SiO_{3/2}]$, in which R can be the same or different and represents a monovalent organic radical which is free from aliphatic carbon-carbon multiple bonding, $R^1$ can be the same or different and represents a monovalent organic radical which has at least one aliphatic carbon-carbon multiple bond, a is 0, 1 or 2 and b is 0 or 1.

9 Claims, No Drawings

ALKENYL GROUP-CONTAINING ORGANO(POLY)SILOXANES

The invention relates to organo(poly)siloxanes and more particularly to organo(poly)siloxanes which have at least one SiC-bonded alkenyl group on each silicon atom, a process for preparing the same and use thereof.

BACKGROUND OF THE INVENTION

Alkenyl group-containing organo(poly)siloxanes have already been disclosed. For example, DE-B-1 023 463 (Union Carbide Corp., published Jan. 30, 1958), DE-A-24 55 502 (General Electric Co., published Jul. 3, 1975) and the corresponding U.S. Pat. No. 3,846,464 (issued Nov. 5, 1974) disclose cyclic siloxanes which have a SiC-bonded vinyl group on each silicon atom. Straight-chain methylvinylsiloxanes are described in DE-B-1 011 147 (General Electric Co., published Jun. 27, 1957) and DE-A-1 745 342 (Rhône-Poulenc S. A., published Nov. 18, 1971) and the corresponding U.S. Pat. No. 3,498,945, issued Mar. 3, 1970. In addition, the preparation of vinyl-containing organopolysiloxane resins by hydrolysis of vinyltriacetoxylsilane is disclosed in GB-A-752 371 (Dow Corning Ltd., published Jul. 11, 1956).

Therefore, it is an object of the present invention to provide organo(poly)siloxanes having at least one carbon-carbon multiple bond linked to each silicon atom. Another object of the present invention is to provide a process for preparing organo(poly)siloxanes having at least one carbon-carbon multiple bond linked to each silicon atom.

SUMMARY OF THE INVENTION

The foregoing objects and others which are apparent from the following description are accomplished in accordance with this invention, generally speaking, by providing organo(poly)siloxanes having units of the formula $[R_aR^1_{3-a}SiO_{1/2}]$, $[R_bR^1_{2-b}SiO_{2/2}]$ and $[R^1SiO_{3/2}]$, in which R can be the same or different and represents a monovalent Organic radical which is free from aliphatic carbon-carbon multiple bonding, $R^1$ can be the same or different and represents a monovalent organic radical which has at least one aliphatic carbon-carbon multiple bond, a is 0, 1 or 2 and b is 0 or 1.

DESCRIPTION OF THE INVENTION

In the above formulas R preferably represents hydrocarbon radicals having from 1 to 12 carbon atom(s), and in particular the methyl radical.

Examples of radicals represented by R are alkyl radicals, such as the methyl, ethyl, n-propyl, isopropyl, n-butyl, isobutyl, tertbutyl, n-pentyl, isopentyl, neopentyl or tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl and dodecyl radicals, such as the n-dodecyl radical; cycloalkyl radicals, such as cyclopentyl, cyclohexyl and cycloheptyl radicals and methylcyclohexyl radicals; aryl radicals, such as the phenyl radical and the naphthyl radical; alkaryl radicals, such as o-, m- and p-tolyl radicals, xylyl radicals and ethylphenyl radicals; and aralkyl radicals, such as the benzyl radical and the α- and β-phenylethyl radical.

The $R^1$ radicals are preferably alkenyl radicals having from 2 to 12 carbon atoms, and in particular the vinyl radical.

Examples of radicals represented by $R^1$ are the vinyl radical, allyl radical, n-but-1-enyl radical, n-but-2-enyl radical, n-but-3-enyl radical, n-pent-1-enyl radical, n-pent-2-enyl radical, n-pent3-enyl radical, n-pent-4-enyl radical, n-hex-1-enyl radical, n-hex-2-enyl radical, n-hex-3-enyl radical, n-hex-4-enyl radical, n-hex-5-enyl radical, cyclohex-1-enyl radical, cyclohex-2-enyl radical, cyclohex-3-enyl radical, cyclohex-4-enyl radical and isopropenyl radical.

The value of a is preferably 1 or 2 and more preferably 2.

The value of b is preferably 1.

Depending on the preparation, up to 50% of the number of all Si-bonded radicals in the organo(poly)siloxanes of this invention can be alkoxy radicals, hydroxyl groups or halogen atoms.

Preferably, the organo(poly)siloxanes of this invention are those of the formula $$[R_aR^1_{3-a}SiO_{1/2}]_v [R_bR^1_{2-b}SiO_{2/2}]_y [R^1SiO_{3/2}]_z \quad (I),$$

in which R, $R^1$, a and b are the same as above, v is 0.01 to 0.5, preferably 0.05 to 0.45 and more preferably 0.05 to 0.35, y is 0.01 to 0.7, preferably 0.1 to 0.6 and more preferably 0.1 to 0.5, and z is 0.01 to 0.95, preferably 0.2 to 0.9 and more preferably 0.4 to 0.8, with the proviso that the sum of v+y+z in formula (I) is 1.

Preferably, the organo(poly) siloxanes of this invention have a molecular weight of from 200 to 100,000 and more preferably from 300 to 5,000.

Preferably, the organo(poly)siloxanes of this invention are liquid and/or soluble in conventional non-polar organic solvents, such as toluene, hexane and xylene, at room temperature and under a pressure of 900 to 1100 hPa. Preferably the organo(poly)siloxanes of this invention are liquid.

The organo(poly)siloxanes of this invention have a viscosity of preferably from 10 to $2 \times 10^6$ mPa.s, and more preferably from 20 to $2 \times 10^4$ mPa.s, at 25° C.

Examples of organo(poly)siloxanes of this invention are $[ViMe_2SiO_{1/2}]_{0.23}[ViMeSiO_{2/2}]_{0.27}[ViSiO_{3/2}]_{0.50}$, $[ViMe_2SiO_{1/2}]_{0.13}[ViMeSiO_{2/2}]_{0.30}[ViSiO_{3/2}]_{0.57}$, $[ViMe_2SiO_{1/2}]_{0.16}[ViMeSiO_{2/2}]_{0.17}[ViSiO_{3/2}]_{0.67}$ and $[ViMe_2SiO_{1/2}]_{0.30}[ViMeSiO_{2/2}]_{0.20}[ViSiO_{3/2}]_{0.50}$, where Vi represents a vinyl radical and Me represents a methyl radical.

The organo(poly)siloxanes of this invention can be prepared by all the processes known heretofore for preparing organo(poly)siloxanes. In this context, reference is made, for example, to W. Noll "Chemie und Technologie der Silicone" ("Silicone chemistry and technology"), Verlag Chemie, Weinheim, 1968, 2nd edition, page 162 et seq. Thus, the organo(poly) siloxanes of this invention can be prepared, for example, by hydrolysis of the corresponding halogenosilanes, organyloxysilanes or hydroxysilanes.

Preferably, the organo(poly)siloxanes of this invention are prepared by reacting a silane of the formula

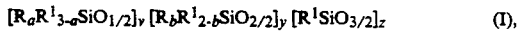

$$R^2_cR^3_{3-c}SiX \quad (II)$$

and/or partial hydrolyzates thereof, a silane of the formula

$$R^2_dR^3_{2-d}SiX_2 \quad (III)$$

and/or partial hydrolyzates thereof, and a silane of the formula $$R^3SiX_3 \quad (IV)$$

and/or partial hydrolyzates thereof, in which formulas $R^2$ can be the same or different and has the same meaning as R, $R^3$ can be the same or different and has the same meaning as $R^1$, X is a chlorine atom or a radical —$OR^4$ in which $R^4$ is a hydrogen atom or a monovalent organic radical, c has the same meaning as a, and d has the same meaning as b, in the presence of water, a catalyst, such as p-toluenesulfonic acid, and optionally an organic solvent.

The radicals $R^4$ are preferably a hydrogen atom or hydrocarbon radicals having from 1 to 4 carbon atom(s), and in particular methyl or ethyl radicals.

Preferably X is a radical —$OR^4$, in which $R^4$ is the same as above, and in particular the ethoxy radical.

Examples of a silane of formula (II) are dimethylvinylethoxysilane, dimethylvinylmethoxysilane, chlorodimethylvinylsilane, dimethylvinylpropoxysilane, dimethyl-1-cyclohexenylethoxysilane and dimethylvinylsilanol. The preferred silanes are the dimethylvinylethoxysilane and dimethylvinylmethoxysilane, in which the dimethylvinylethoxysilane is the more preferred silane.

Examples of a silane of formula (III) are diethoxymethylvinylsilane, dimethoxymethylvinylsilane, dipropoxymethylvinylsilane and dichloromethylvinylsilane, in which the alkoxysilanes are preferred and diethoxymethylvinylsilane is the more preferred silane (III), Examples of a silane of formula (IV) are triethoxyvinylsilane, trimethoxyvinylsilane, tripropoxyvinylsilane, trichlorovinylsilane and diethoxychlorovinylsilane, in which the alkoxysilanes are preferred and triethoxyvinylsilane is the more preferred silane (IV).

In the process of this invention, the silanes of formulas (II) to (IV) and/or partial hydrolyzates thereof are preferably mixed with a catalyst and then water is added.

The process of this invention is preferably carried out at a temperature of from 0° C. to 200° C., and more preferably from 10 to 100° C., and at a pressure of the ambient atmosphere, that is between about 900 and 1100 hPa. However, the process of this invention can also be carried out under higher or lower pressures.

The organo(poly)siloxanes of this invention have the advantage that they have a high density of SiC-bonded organic radicals having at least one aliphatic carbon-carbon multiple bond. Furthermore, the siloxanes of this invention have the advantage that they comprise organic radicals having at least one aliphatic carbon-carbon multiple bond in different chemical environments, such as, for example, $ViMe_2SiO_{1/2}$, $ViMeSiO$ and $ViSiO_{3/2}$. Especially in the case of hydrosilylation reactions, the aliphatically unsaturated radicals of the siloxanes of this invention in some cases show very large differences in reactivity, which can be utilized in numerous applications. By a suitable choice of the ratio of amounts of the silanes of formulas (II), (III) and (IV), organo(poly)siloxanes can be prepared according to this invention having a spectrum of specific properties corresponding to the particular application.

The organo(poly)siloxanes of this invention can be used for all the purposes for which organo(poly)siloxanes having at least one aliphatic carbon-carbon multiple bond have also been used heretofore. Thus, the organo(poly)siloxanes of this invention are especially suitable, for example, as crosslinking agents in organopolysiloxane compositions which crosslink by the addition of Si-bonded hydrogen to an aliphatic carbon-carbon multiple bond (so-called hydrosilylation).

In the examples described below, all viscosities are at a temperature of 25° C. Unless otherwise specified, the following examples are carried out under a pressure of the ambient atmosphere, that is under about 1000 hPa, and at room temperature, that is at about 23° C., or at a temperature which is attained on adding the reactants together at room temperature without additional heating or cooling. In addition, all parts and percentages are by weight, unless otherwise indicated.

The following abbreviations are used: Me: methyl radical and Vi: vinyl radical.

EXAMPLE 1

About 380 g of triethoxyvinylsilane, 160 g of diethoxymethylvinylsilane, 130 g of dimethylvinylethoxysilane and 2.0 of p-toluenesulfonic acid are initially introduced into a round-bottomed flask provided with a reflux condenser and a dropping funnel, and 162 g of water are added dropwise over a period of 2 to 5 minutes. The internal temperature rises to 57° C. The ethanol formed is then distilled off at 120° C. and at 1000 hPa. About 250 g of xylene and 8 0 g of chalk are then added and the mixture is stirred well and distilled again at 120° C. and at 500 Pa. About 330 g of a clear, slightly yellowish liquid which has a viscosity of 80 mm$^2$/s and a refractive index $n_D^{25}$ of 1.4469 and the following average formula $[ViMe_2SiO_{1/2}]_{0.23}[ViMeSiO_{2/2}]_{0.27}[ViSiO_{3/2}]_{0.50}$ are obtained. According to NMR determination, the residual ethoxy content is 3.7%, with respect to the total number of all SiC-bonded radicals.

EXAMPLE 2

About 380 g of triethoxyvinylsilane, 80.0 g of diethoxymethylvinylsilane, 65.0 g of dimethylvinylethoxysilane and 2.0 g of p-toluenesulfonic acid are initially introduced into a round-bottomed flask provided with a reflux condenser and a dropping funnel, and 135 g of water are added dropwise over a period of 2 to 5 minutes. The internal temperature increases to 57° C. The ethanol formed is then distilled off at 120° C. and at 1000 hPa. About 250 g of xylene and 8.0 g of chalk are then added and the mixture is stirred well and distilled again at 120° C. and at 500 Pa. About 218 g of a clear, slightly yellowish liquid which has a viscosity of 12000 mPa.s and the following average formula $[ViMe_2SiO_{1/2}]_{0.16}[ViMeSiO_{2/2}]_{0.17}[ViSiO_{3/2}]_{0.67}$ are obtained. According to NMR determination, the residual ethoxy content is 4.5% with respect to the total number of all SiC-bonded radicals.

EXAMPLE 3

About 380 g of triethoxyvinylsilane, 160 g of diethoxymethylvinylsilane, 65.0 g of dimethylvinylethoxysilane and 2.0 g of p-toluenesulfonic acid are initially introduced into a round-bottomed flask provided with a reflux condenser and a dropping funnel, and 153 g of water are added dropwise over a period of 2 to 5 minutes. The internal temperature increases to 57° C. The ethanol formed is then distilled off at 120° C. and at 1000 hPa. About 250 g of xylene and 8.0 g of chalk are then added and the mixture is stirred well and distilled again at 120° C. and at 500 Pa. About 260 g of a clear, slightly yellowish liquid which has a viscosity of 4540 mm²/s and the following average formula $[ViMe_2SiO_{1/2}]_{0.13}[ViMeSiO_{2/2}]_{0.30}[ViSiO_{3/2}]_{0.57}$ are obtained. According to NMR determination, the residual ethoxy content is 4.0%, with respect to the total number of all SiC-bonded radicals.

What is claimed is:

1. An organo(poly)siloxane composed of units of the formula $[R_aR^1_{3-a}SiO_{1/2}]$, $[R_bR^1_{2-b}SiO_{2/2}]$ and $[R^1SiO_{3/2}]$, in which R is a monovalent organic radical which is free from aliphatic carbon-carbon multiple bonding, $R^1$ is a monovalent organic radical having at least one aliphatic carbon-carbon multiple bond, a is 0, 1 or 2 and b is 0 or 1.

2. The organo(poly)siloxane of claim 1, wherein R is a methyl radical.

3. The organo(poly)siloxane of claim 1 wherein $R^1$ is a vinyl radical.

4. The organo(poly)siloxane of claim 1, wherein the organo(poly)siloxane is represented by the formula

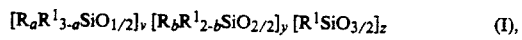

$[R_aR^1_{3-a}SiO_{1/2}]_v [R_bR^1_{2-b}SiO_{2/2}]_y [R^1SiO_{3/2}]_z$ (I), in which R is a monovalent organic radical which is free from aliphatic carbon-carbon multiple bonding, $R^1$ is a monovalent organic radical having at least one aliphatic carbon-carbon multiple bond, a is 0, 1 or 2 and b is 0 or 1, v is 0.01 to 0.5, y is 0.01 to 0.7 and z is 0.01 to 0.95, with the proviso that the sum of v+y+z in formula (x) is 1.

5. The organo(poly)siloxane of claim 4, wherein v is 0.05 to 0.45, y is 0.1 to 0.6 and z is 0.2 to 0.9, with the proviso that the sum of v+y+z in formula (I) is 1.

6. The organo(poly)siloxane of claim 1, wherein the organo(poly)siloxane has a viscosity of 10 to $2 \times 10^6$ mPa.s at 25° C.

7. A process for preparing an organo(poly)siloxane of the formula $[R_aR^1_{3-a}SiO_{1/2}]$, $[R_bR^1_{2-b}SiO_{2/2}]$ and $[R^1SiO_{3/2}]$, in which R is a monovalent organic radical which is free from aliphatic carbon-carbon multiple bonding, $R^1$ is a monovalent organic radical having at least one aliphatic carbon-carbon multiple bond, a is 0, 1 or 2 and b is 0 or 1, which comprises reacting a silane of the formula

$R^2_cR^3_{3-c}SiX$ (II)

and/or partial hydrolyzates thereof, a silane of the formula

$R^2_dR^3_{2-d}SiX_2$ (III)

and/or partial hydrolyzates thereof, and a silane of the formula

$R^3SiX_3$ (IV)

and/or partial hydrolyzates thereof, in which $R^2$ is a monovalent organic radical which is free from aliphatic carbon-carbon multiple bonding, $R^3$ is a monovalent organic radical having at least one aliphatic carbon-carbon multiple bond, X is a chlorine atom or a radical $-OR^4$, in which $R^4$ is a hydrogen atom or a monovalent organic radical, x is 0, 1 or 2 and d is 0 or 1, in the presence of water, a catalyst and optionally an organic solvent.

8. The process of claim 7, wherein X is the $-OR^4$ radical, in which $R^4$ is a hydrogen atom or a monovalent organic radical.

9. A crosslinkable organopolysiloxane composition comprising an organopolysiloxane containing Si-bonded hydrogen and the organo(poly)siloxane of claim 1 having an aliphatic carbon-carbon multiple bond.

* * * * *